United States Patent [19]
Uchida et al.

[11] Patent Number: 6,078,115
[45] Date of Patent: *Jun. 20, 2000

[54] AIR-COOLED MOTOR

[75] Inventors: Hiroyuki Uchida; Yukio Katsuzawa, both of Minamitsuru-gun; Yasuyuki Nakazawa, Fujiyoshida, all of Japan

[73] Assignee: FANUC LTD, Yamanashi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/091,582

[22] PCT Filed: Nov. 7, 1997

[86] PCT No.: PCT/JP97/04068

§ 371 Date: Jun. 23, 1998

§ 102(e) Date: Jun. 23, 1998

[87] PCT Pub. No.: WO98/20601

PCT Pub. Date: May 14, 1998

[30] Foreign Application Priority Data

Nov. 7, 1996 [JP] Japan ................... 8-309964

[51] Int. Cl.$^7$ ................................................ H02K 9/00
[52] U.S. Cl. ................................. 310/58; 310/61
[58] Field of Search ................. 310/58, 51, 62, 310/61, 54, 52

[56] References Cited

U.S. PATENT DOCUMENTS

| | | | |
|---|---|---|---|
| 2,527,878 | 10/1950 | Fechheimer | 310/54 |
| 3,447,843 | 6/1969 | Shipman | 310/144 |
| 3,476,961 | 11/1969 | Heard et al. | 310/54 |
| 3,679,277 | 7/1972 | Dohmen | 384/480 |
| 4,350,908 | 9/1982 | Riffe | 310/61 |
| 4,465,948 | 8/1984 | Oyama et al. | 310/62 |
| 5,060,238 | 10/1991 | Karube et al. | 372/58 |
| 5,589,720 | 12/1996 | Berger | 310/61 |
| 5,747,900 | 5/1998 | Nakamura et al. | 310/58 |
| 5,780,946 | 7/1998 | Nakamura et al. | 310/58 |

FOREIGN PATENT DOCUMENTS

| | | |
|---|---|---|
| 0 387 743 A1 | 3/1990 | European Pat. Off. . |
| 0 440 096 A1 | 1/1991 | European Pat. Off. . |
| 42 02 510 A1 | 8/1993 | European Pat. Off. . |
| 0 387 743 B1 | 12/1993 | European Pat. Off. . |
| 2 500 776 | 3/1982 | France . |
| 42 22 131 | 9/1994 | Germany . |
| 55-4612 | 6/1978 | Japan . |
| 63-51560 | 4/1988 | Japan . |
| 2-68659 | 5/1990 | Japan . |
| 2-188143 | 7/1990 | Japan . |
| 2-197237 | 8/1990 | Japan . |
| 6-13370 | 2/1994 | Japan . |
| 8-10976 | 1/1996 | Japan . |

*Primary Examiner*—Nestor Ramirez
*Assistant Examiner*—Joseph Waks
*Attorney, Agent, or Firm*—Staas & Halsey, LLP

[57] ABSTRACT

An air passage extending in the axial direction of a motor shaft is formed in a plurality of places in the peripheral wall of a motor housing. An extension tube is fixed to a rear end of the motor housing to provide a space for mounting a rotary joint for connecting a coolant feed pipe to the end of a through hole in the motor shaft, and the extension tube is used as an exhaust (ventilation) passage so that the motor can be cooled with air introduced into the air passage through the tube by using a fan provided on a rear end of the extension tube.

8 Claims, 3 Drawing Sheets

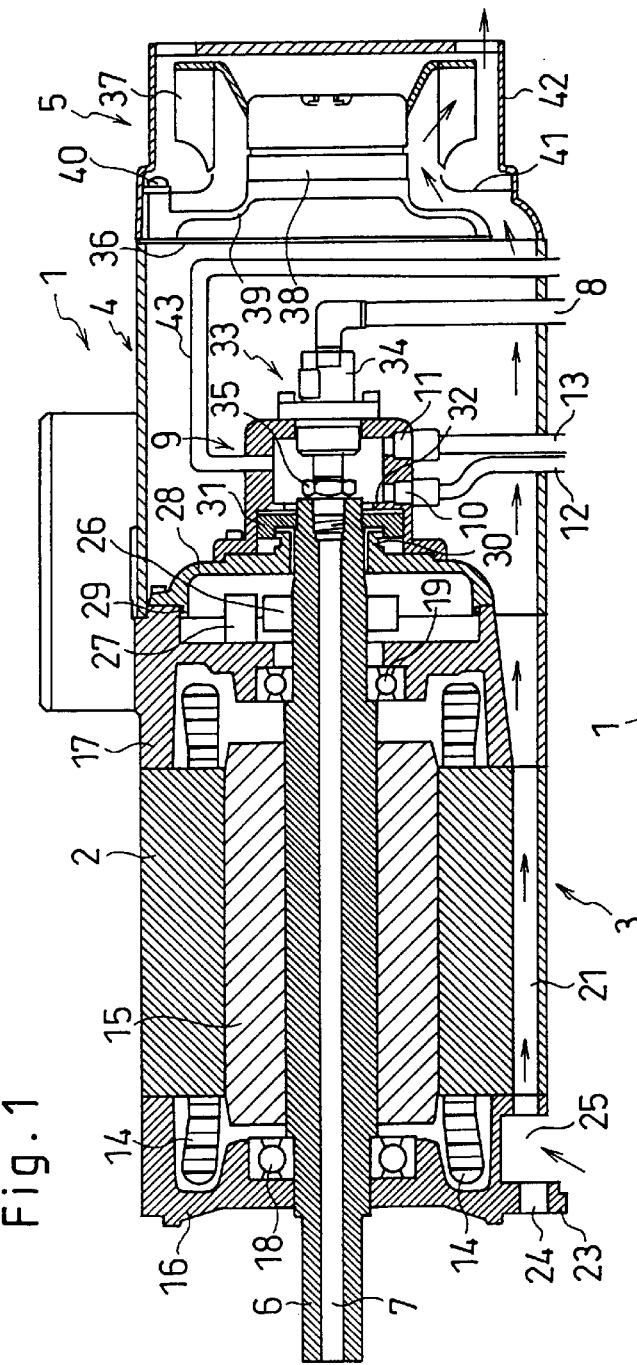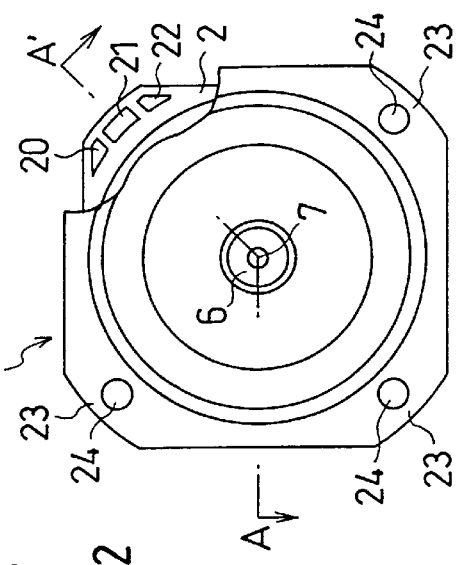

AIR-COOLED MOTOR

TECHNICAL FIELD

This invention relates to the improvement of an air-cooled motor forcedly cooled down with a fan.

BACKGROUND ART

In general, an air-cooled motor is cooled down with a number of cooling fins vertically provided on the circumference of a motor housing by making use of natural radiation or by blowing air from a forced-air cooling fan to the cooling fins. In either case, since heat is only absorbed from the motor with the medium of air contacting the surfaces of the cooling fins, satisfactory cooling effect is not expected, and besides, it is necessary to provide a sufficient space around the motor housing for feeding fresh air to the cooling fins at all times, resulting difficulty in arranging mechanical components close to each other.

When an air-cooled motor is used for driving a machine tool and cooling of the air-cooled motor is carried out by blowing air from the forced-air cooling fan to the cooling fins, air having absorbed heat from the motor is blown against a column or a feed shaft of the machine tool, with the result that variation in the dimensions of members due to thermal expansion may lower accuracy. For this reason, it is customary to set the blowing direction of air from the forced-air cooling fan to be parallel with a motor shaft for preventing such a problem from arising, and a number of machines are designed is such a manner.

However, spindle-through-coolant is often applied to the recent machine tool by directly connecting a main shaft to the motor shaft for the speed-up of the main shaft and the improvement in power efficiency. In this case, as shown in FIG. 4, for instance, a motor shaft 101 has a coolant feed passage (a through hole) 100, and a coolant feed pipe 102 and a pipe joint 103 are arranged on the axial rear side (that is, the side opposite to the main shaft, i.e., the right side in FIG. 4) of the motor shaft 101. On the other hand, the main shaft (not shown) is located on the axial front side (i. e., the side of the main shaft, i.e., the left side in FIG. 4) of the motor shaft 101. Thus, a forced-air cooling fan cannot be provided on either side i.e., the axial front side and the axial rear side of the motor shaft 101. For this reason, a forced-air cooling fan 105 is provided in the vicinity of the center of a motor housing 104 in such a posture that the axial center of a rotary shaft of the forced-air cooling fan is allowed to extend orthogonally to the axis of the motor shaft 101, as shown in FIG. 4.

In the prior art shown in FIG. 4, the center of the motor housing 104 and the forced-air cooling fan 105 are covered with a hood 106, and a motor 107 is forcedly air-cooled as if the motor takes the shape of a ducted fan. However, as only the center of the motor 107 is cooled, cooling efficiency of the motor is low, and if a column or a feed shaft is disposed in the course of warmed air, accuracy may be lowered.

DISCLOSURE OF THE INVENTION

An object of the present invention is to provide an air-cooled motor, in which forced cooling of the motor can be effected with air supplied in an direction of a motor shaft, even when spindle-through coolant is used.

In order to attain the above object, an air-cooled motor according to the present invention comprises a motor body having a motor shaft in the center thereof a motor housing having a plurality of air passages extending in the direction of the axis of the motor shaft, an extension tube having one end fixed to one end of the motor housing, and an air-cooling fan mounted on the other end of the extension tube, wherein, when the fan is rotated, outside air is first drawn into the air passages formed in the motor housing, and then flows into the extension tube after passing through the air passages, or outside air is first drawn into the extension tube and then passes through the air passages formed in the motor housing.

Preferably, a coolant-feeding through hole is formed in the motor shaft, and one end of a coolant feed pipe extending through the extension tube is connected to an opening end of the through hole in the motor shaft through a connection member.

More preferably, the connection member is arranged between the motor housing and the fan.

More preferably, the opening end of the through hole in the motor shaft and at least a part of the connection member are covered with a closed chamber, the closed chamber is provided with a drain for the recovery of coolant having leaked through the connection member or a gap between the connection member and the through hole in the motor shaft, and a drain pipe connected to the drain is arranged to lead to the outside through a peripheral wall portion of the extension tube.

According to the present invention, even an air-cooled motor, to which spindle-through coolant is used, can be cooled down with air supplied in axial direction of the motor shaft. Further, since there is no possibility that air having absorbed heat from the motor is blown against the column or the feed shaft of the machine tool, each part of the machine tool can be protected from thermal expansion to maintain stable machining accuracy.

Further, since cooling of the motor is carried out with air flowing through the air passages formed in the peripheral wall of the motor housing, it is not necessary to provide a wide space around the motor housing, unlike the case of utilizing the effect of heat radiation by the fins on the circumference of the motor housing, so that compact arrangement of machine elements around motor housing can be made.

Besides, since the connection portion between the coolant-feeding through hole provided in the motor shaft and the coolant feed pipe is enclosed by the closed chamber, even when the coolant leaks through the connection portion, the coolant, together with exhaust, would not be blown against the machine tool or the like, and as a result, any problem such as rust on the machine tool and the abnormal condition of electrical equipment does not arise.

BRIEF DESCRIPTION OF THE DRAWINGS

FIG. 1 is a side sectional view showing the structure of an air-cooled motor according to one embodiment of the present invention;

FIG. 2 is a front view showing the air-cooled motor of FIG. 1;

BEST MODE OF EMBODYING THE INVENTION

Figure 3:
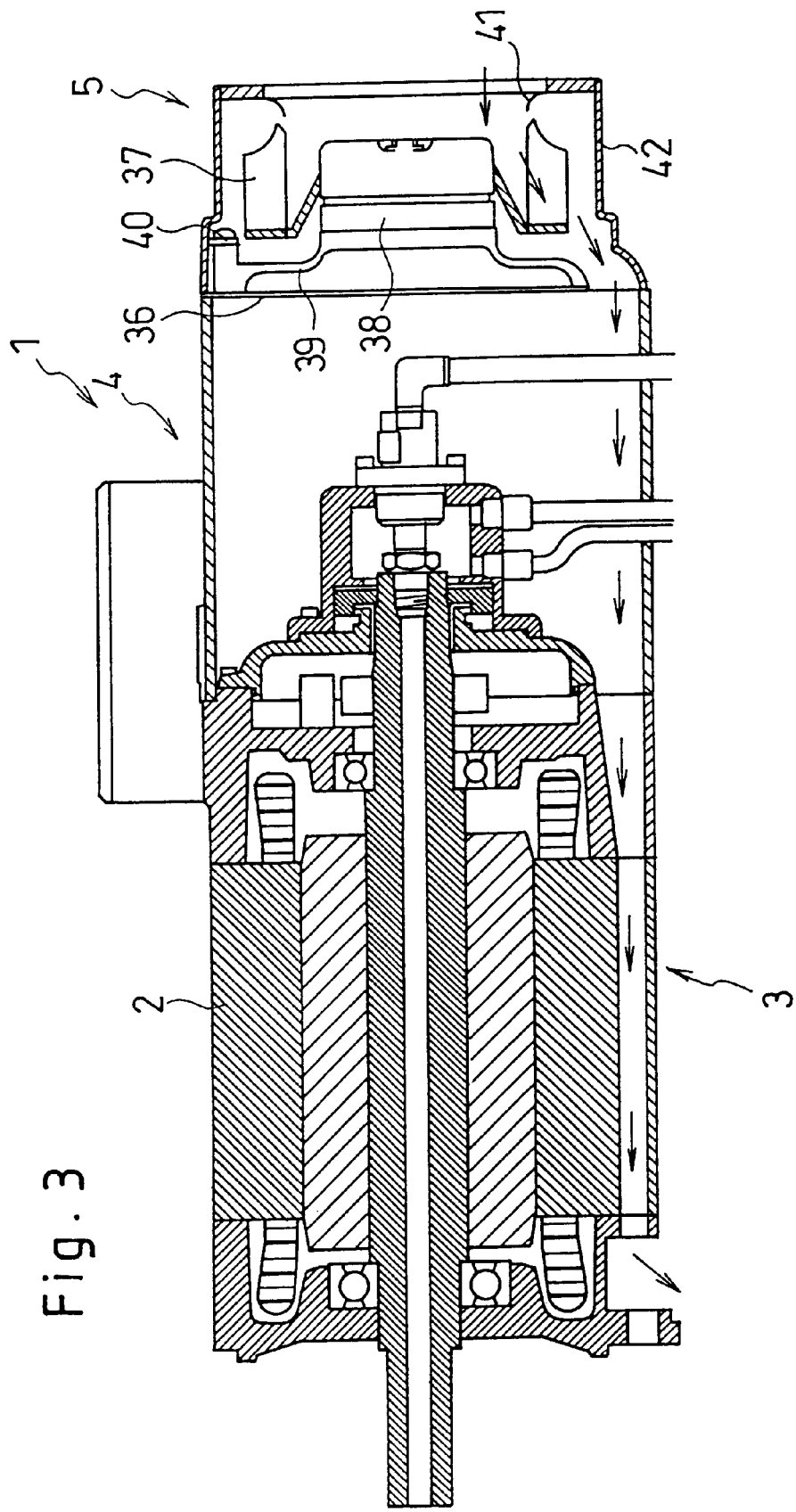
FIG. 3 is a side sectional view showing a modification of the air-cooled motor of FIG. 1.
Figure 4:
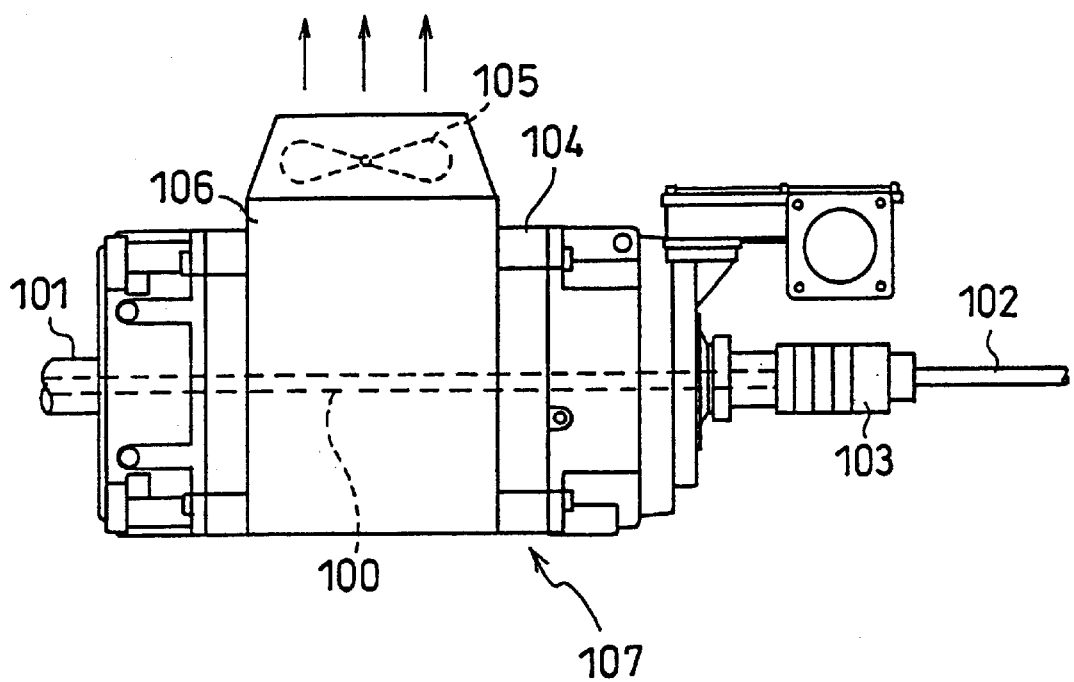
FIG. 4 is a schematic view showing an air-cooled motor of the prior art.

Hereinafter will be described one embodiment of the present invention together with its modification with reference to FIGS. 1 to 3. Incidentally, FIG. 1 shows a section taken along a line A–A' in FIG. 2.

An air-cooled motor 1 as one embodiment of the present invention comprises a motor body 3 which is composed of a peripheral wall housing 2 having a coil 14 integrally formed with a stator core, a motor shaft 6 fixedly mounted with a rotor 15 composed of a rotor core and an aluminum die casting, a head cover 16 through which the front end portion of the motor shaft 6 passes and which closes up a front end of the peripheral wall housing 2, and a bottom cover 17 through which the rear end portion of the motor shaft 6 passes and which closes up a rear end of the peripheral wall housing 2. The peripheral wall housing 2, the head cover 16 and the bottom cover 17 are combined to form an entire motor housing. The motor shaft 6 is rotatably axially supported by the bearing 18 mounted on the head cover 16 and the bearing 19 mounted on the bottom cover 17, respectively.

As shown in FIG. 1, in addition to the motor body 3, the air-cooled motor 1 comprises a cylindrical extension tube 4 fixed to a rear end of the bottom cover 17 of the motor housing, a forced-air cooling fan 5 mounted on a rear end of the extension tube 4, a closed chamber 9 provided so as to cover a connection portion between a coolant-feeding through hole 7 formed in the motor shaft 6 of the motor body 3 and a coolant feed pipe 8, drains 10, 11 arranged in the closed chamber 9, and drain pipes 12, 13 connected to the drains 10, 11.

As shown in FIG. 2, the peripheral wall housing 2 is comprises a prism-shaped member which is square in cross section but four corners of the square are chamfered and which has through hole at its center. The through hole is circular in cross section and has a diameter large enough to house the rotor 15. The peripheral wall housing 2 has first, second and third through holes as air passages 20, 21 and 22 in each of chamfered four corners of the peripheral wall housing. These through holes extend in parallel to the axial center of the motor shaft 6. In addition, the head cover 16 and the bottom cover 17 respectively fixed to the front end and the rear end of the peripheral wall housing 2 also have holes (not shown) in places corresponding to the air passages 20, 21 and 22. These holes have the some cross section as that of the air passages 20, 21 and 22.

The head cover 16 also has chamfered four corners similar to those of the peripheral wall housing 2, as shown in FIG. 2. The head cover 16 has flanges 23 integrally formed therewith at four places corresponding to chamfered four corners of the head cover. Each flange 23 has a bolt-hole 24 necessary for mounting the air-cooled motor 1 on various machines. Further, as shown in FIG. 1, in each flange 23 of the head cover 16 has a radially outwardly opening notch 25 at a position corresponding to the place of the bolt-hole 24. Thus, the air passages 20, 21 and 22 are not blocked with the bolts or nuts (not shown) inserted into the bolt-holes 24.

The motor shaft 6 has a coolant-feeding through hole 7 formed concentric with the axial center of the motor shaft 6. A tapered female thread for connecting a pipe is provided on the rear end side of the through hole 7 up to an opening portion of the through hole 7.

A first annular sensor element 26 is fixed to the circumference of the rear end of the motor shaft 6. On the other hand, a second sensor element 27 is fixed to the rear side surface of the bottom cover 17. The first sensor element 26 and the second sensor element 27 are arranged facing each other leaving a predetermined space therebetween, thereby forming a position sensor to detect the rotating position of the motor shaft 6.

Further, a housing base 28 for fixing a closed chamber 9 is mounted on the rear end surface of the bottom cover 17 through an O-ring 29 serving as a gasket. The first sensor element 26 and the second sensor element 27 are arranged within a space defined by the bottom cover 17 and the housing base 28. In the center of the housing base 28, there is a hole of a diameter enough to permit the motor shaft 6 to pierce through the housing base, and the rear end of the motor shaft 6 is inserted through the hole. Further, an annular peripheral wall 30 is integrally formed in the center of the rear side surface of the housing base 28, surrounding the hole through which the motor shaft 6 is passed.

On the other hand, a flinger (a rotary seal member) 31 is fixed to the circumference of the rear end of the motor shaft 6. In the center of the flinger 31, a through hole is formed for passing through the motor shaft 6, while in the front side surface of the flinger, an annular recess is formed around the through hole. A part of the annular peripheral wall 30 of the housing base 28 is fitted into the recess of the flinger 31. Then, when the flinger 31 is rotated in synchronism with the rotation of the motor shaft 6, the inner wall of the recess in the flinger 31 and the circumferential surface of the annular peripheral wall 30 are opposed to each other with a slight space therebetween, so that a gap between the motor shaft 6 and the housing base 28 is made watertight.

The closed chamber 9 taking a shape a substantially cylindrical container is fixed to the housing base 28. The closed chamber 9 has a flange extending from an opening end thereof outwardly in a radial direction. The closed chamber 9 is fixed to the housing base 28 with bolts inserted into a plurality of bolt holes (not shown) formed in the flange. The closed chamber 9 fixed to the housing base is concentric with the axial center of the motor shaft 6.

The closed chamber 9 has a flange-shaped water-proof wall 32 projecting from the inner surface, at its substantial axial center, inwardly in its radial direction. A top end surface of the water-proof wall 32 is arranged to face a circumferential surface of the front end of the motor shaft 6 leaving a slight space therebetween.

Further, in the bottom of the closed chamber 9, there is a through hole, into which a fixed-side member 34 of a rotary joint 33 is fitted. The rotary joint 33 is a kind of pipe joint composed of the fixed-side member 34 and a rotating-side member 35, and the rotating-side member 35 is freely rotatable with respect to the fixed-side member 34. The fixed-side member 34 of the rotary joint 33 is inserted into the through hole in the bottom of the closed chamber 9 and fixed to the bottom of the closed chamber 9 with a plurality of bolts. The fixed-side member 34 fixed to the closed chamber is concentric with the axial center of the motor shaft 6.

On the other hand, the rotating-side member 35 of the rotary joint 33 is fixed to the motor shaft 6, and rotated together with the motor shaft 6. A tapered male thread is provided on the circumferential surface of the front end of the rotating-side member 35, while a tapered female thread is provided on the inner surface of the rear end of the through hole 7 in the motor shaft 6, so that the rotating-side member 35 is fixed to the motor shaft 6 by fitting the tapered male thread on the rotating-side member 35 into the tapered female thread on the surface of the through hole 7. The rotating-side member 35, fixed to the motor shaft, is rotated together with the motor shaft 6.

Since it is difficult to completely prevent the leakage of coolant through the connection portion between the rotating-side member 35 and the fixed-side member 34 of the rotary joint 33, the drains 10, 11 for draining the coolant which has leaked through these portions, to the outside, are provided in the bottom surface of the closed chamber 9. The coolant having leaked through the connection portion between the rotating-side member 35 and the fixed-side member 34 is allowed to remain in the closed chamber 9 with the aid of the water-proof wall 32 formed on the inside of the closed chamber 9. Further, even if the level of the coolant having leaked through the connection portion exceeds the height of the water-proof wall 32, the linger 31 prevents the coolant in the closed chamber 9 from intruding into the housing base 28 and also prevents the coolant in the closed chamber 9 from flowing outside.

The O-ring 29 is interposed in a joint portion between the housing base 28 and the bottom cover 17. When the coolant having leaked through the connection portions between the drains 10, 11 and the drain pipes 12, 13 and between the rotary joint 33 and the coolant feed pipe 8 reaches the joint portion between the housing base 28 and the bottom cover 17 by way of the closed chamber 9 and the housing base 28 or the like, the O-ring 29 prevents the coolant in the joint portion from intruding into the inside due to capillarity or the like.

The cylindrical extension tube 4 fixed to the rear end of the bottom cover 17 of the motor housing has an axial length enough to house at least the housing base 28, the closed chamber 9 and the rotary joint 33 in the extension tube. The drain pipes 12, 13 connected to the drains 10, 11 provided in the bottom surface of the closed chamber 9 and the coolant feed pipe 8 connected to the rotary joint 33 are respectively arranged to lead to the outside of the extension tube 4 through the holes respectively formed in a cylindrical portion of the extension tube 4.

The cylindrical extension tube 4 has a flange portion 36 extending by a small amount from the rear end of the extension tube inwardly in a radial direction. A stay 39 is fixed to the flange portion 36 with four pieces of bolts 40. Further, an annular rectifying plate 41 is also fixed to the flange portion 36 with these bolts 40. Then, a forced-air-cooling fan 37 and a motor 38 for driving the fan 37 for rotation are mounted on the stay 39. The fan 37 mounted on the stay 39 is covered with a duct 42 fixed to the rear end of the extension tube 4. The rectifying plate 41, the fan 37 and the duct 42 constitute a turbo fan.

In the air-cooled motor 1 shown in FIG. 1, air for cooling the motor is drawn into the motor from the side of the head cover 16 and exhausted through the duct 42. Otherwise, the cooling air may be drawn into the motor from the side of the duct 42 and exhausted through the head cover 16 by reversing the flow direction of the cooling air. In this case, as shown in FIG. 3, the fan 37 and the rectifying plate 41 may be mounted in a posture reverse to that shown in FIG. 1.

When the fan 37 is rotated on condition that the fan 37 and the rectifying plate 41 are mounted in directions as shown in FIG. 1 respectively; air is drawn out of the extension tube 4, which then produces negative pressure, and air drawn into the air passages 20, 21 and 22 through the notch 25 on the front end side of the peripheral wall housing 2 absorbs heat from the motor 11 as the air flows through the air passages 20, 21 and 22 toward the rear of the peripheral wall housing 2. On the other hand, when the fan 37 is rotated on condition that the fan 37 and the rectifying plate 41 are mounted in directions as shown in FIG. 3, respectively, outside air is drawn into the extension tube 4 through the duct 42, and absorbs heat from the motor 1 when flowing through the air passages 20, 21 and 22 toward the front of the peripheral wall housing 2.

As described above, according to the present invention, the cooling of the motor body 3 is carried out with air forcedly fed to the air passages 20, 21 and 22 provided in the peripheral wall housing 2. Thus, an area itself of the heat radiating portion in the present invention is considerably small as compared with that available by a conventional air-cooled motor having a large number of cooling is vertically provided on the circumference of the motor housing. However, according to the present invention, since the turbo fan is used to forcedly feed a large quantity of air into the air passages 20, 21 and 22, the air-cooled motor in the present invention is superior in cooling performance to the prior-art air-cooled motor.

As apparent from the above description, according to the present invention, since it is not necessary to provide any cooling fin on the circumference of the motor housing, the diameter of the motor itself can be reduced, and besides, there is no possibility that warmed air resulting from absorbing heat from the motor will be blown against the column or the feed shaft of the machine tool thus heating them, so that various elements of the machine tool can be arranged compactly, thereby enabling the machine tool to operate with more stable machining accuracy.

Further, even when the leakage of coolant occurs in the connection portion between the fixed-side member 34 and the rotating-side member 35 of the rotary joint 33 or between the rotating-side member 35 and the through hole 7 in the motor shaft 6, the coolant having leaked through such connection portions can be held in the closed chamber 9. Thus, there is no fear of having the coolant scattered together with exhaust to rust the machine tool or the electrical equipment. The coolant collected in the closed chamber 9 can be drained outside the motor 1 through the drains 10, 11 and the drain pipes 12, 13. Further, if necessary, a compressed air pipe 43 may be additionally connected to the inside of the closed chamber 9 to supply compressed air into the closed chamber 9 to force the remaining coolant on the bottom of the closed chamber 9 to be completely drained through the drain pipes.

What is claimed is:

1. An air-cooled motor, comprising:
   a motor body having a motor shaft in a center thereof,
   a motor housing having a plurality of air passages extending in a direction of an axis of the motor shaft;
   an extension tube having a first end fixed to one end of said motor housing and an air-cooling fan mounted on a second end of said extension tube, said extension tube forming an internal space between said motor housing and the air-cooling fan allowing at least a rotary joint and piping to be arranged in the internal space, wherein when the air-cooling fan is rotated, outside air is first drawn into the air passages formed in said motor housing and then flows into said extension tube after passing through the air passages, or the outside air is first drawn into said extension tube and then passes through the air passages formed in said motor housing.

2. An air-cooled motor according to claim 1, further comprising:
   a coolant feed pipe;
   a coolant-feeding through hole formed in the motor shaft; and
   a connection member, wherein a first end of the coolant feed pipe extends through said extension tube and is connected to an opening end of the through hole in said motor shaft through said connection member.

3. An air-cooled motor according to claim 2, wherein said connection member is arranged between said motor housing and the air-cooling fan.

4. An air-cooled motor according to claim 2, wherein the opening end of the through hole in said motor shaft and at least a part of said connection member are covered with a closed chamber, the closed chamber provided with one of a drain recovering coolant having leaked through said connection member and a gap between said connection member and the through hole in said motor shaft and a drain pipe connected to the drain is arranged to lead to the outside through a peripheral wall portion of said extension tube.

5. An air-cooled motor according to claim 2, further comprising:
   a housing base having a through hole in a center thereof for passing one end of said motor shaft, said housing base being fixed to one end surface of said motor housing; and
   a substantially disc-shaped flinger fixed to a circumference of the one end of the motor shaft so that said flinger is rotated within a closed chamber as the motor shaft rotates, wherein one end surface of said housing base and one end surface of said flinger are arranged to face each other through a slight space provided therebetween to form a rotary seal member between said housing base and said flinger.

6. An air-cooled motor according to claim 4, wherein said connection member is a rotary joint composed of a rotating-side member and a fixed-side member, and the rotating-side member is fitted and fixed to an end of the coolant-feeding through hole in the motor shaft, while the fixed-side member extends through a wall of a closed chamber and is fixed to the wall.

7. An air-cooled motor having a motor shaft and a housing, comprising:
   a plurality of air passages extending in a direction of an axis of the motor shaft;
   an extension tube having a first end fixed to one end of the housing and a fan mounted on a second end of said extension tube, said extension tube forming an internal space between the housing and the fan allowing at least a rotary joint and piping to be arranged in the internal space;
   wherein, when the fan is rotated, outside air is first drawn into the air passages formed in the housing and then flows into said extension tube after passing through the air passages, or the outside air is first drawn into said extension tube and then passes through the air passages formed in the housing.

8. An air-cooled motor, comprising:
   a motor body having a motor shaft formed with a through hole for feeding coolant;
   a motor housing formed with a plurality of air passages, each extending in a direction of the motor shaft;
   an extension tube having a front end fixed to a rear end of said motor housing;
   a duct having a front end fixed to a rear end of said extension tube;
   an air-cooling fan housed inside said duct, said air-cooling fan drawing in outside air through the plurality of air passages or sending outside air into the plurality of air passages;
   a coolant feeding pipe which goes through a peripheral wall of said extension tube from outside to inside; and
   a rotary joint, arranged inside said extension tube, said rotary joint comprising a rotating side member and a fixed side member, the fixed side member being connected to said coolant feeding pipe and the rotating side member rotating together with the motor shaft, wherein coolant fed through said coolant feeding pipe is subsequently fed to the through hole to feed coolant to the motor shaft.

* * * * *

UNITED STATES PATENT AND TRADEMARK OFFICE
CERTIFICATE OF CORRECTION

PATENT NO. : 6,078,115
DATED : June 20, 2000
INVENTOR(S) : Hiroyuki Uchida, et al.

Page 1 of 1

It is certified that error appears in the above-identified patent and that said Letters Patent is hereby corrected as shown below:

Column 1,
Line 18, after "resulting" insert -- in --; delete "in" (second occurrence);
Line 63, after "an" insert -- axial --;
Line 67, after "thereof" insert -- , --.

Column 4,
Line 26, after "shape" insert -- of --.

Column 5,
Line 2, delete -- , -- (first occurrence).

Column 6,
Line 7, delete "is" after "cooling" and insert -- fins --.

Signed and Sealed this

Eleventh Day of September, 2001

*Attest:*

NICHOLAS P. GODICI
*Attesting Officer*   *Acting Director of the United States Patent and Trademark Office*